United States Patent
Pauley et al.

(10) Patent No.: US 6,250,131 B1
(45) Date of Patent: Jun. 26, 2001

(54) APPARATUS AND METHOD FOR CONTROLLING AND MEASURING STEAM QUALITY

(75) Inventors: James Craig Pauley, Sugar Land, TX (US); James Lindsey Gilbert Schrodt; Eric L. Berger, both of Bakersfield, CA (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/394,967

(22) Filed: Sep. 10, 1999

(51) Int. Cl.⁷ .............................. F17D 3/00; B01D 19/00; F16L 41/02; G01N 7/14; G01F 1/74

(52) U.S. Cl. ..................... 73/19.05; 73/19.1; 73/29.01; 73/200; 422/93

(58) Field of Search ................................ 73/19.04, 19.05, 73/19.1, 64.44, 64.55, 29.01, 29.05, 152.42, 200, 861.04; 422/93, 68.1

(56) References Cited

U.S. PATENT DOCUMENTS

| | | | |
|---|---|---|---|
| 3,430,483 | * 3/1969 | Clawson et al. | 73/29 |
| 3,686,924 | * 8/1972 | Ludt et al. | 73/53 |
| 3,934,469 | * 1/1976 | Howard et al. | 73/155 |
| 4,409,825 | * 10/1983 | Martin et al. | 73/155 |
| 4,522,218 | 6/1985 | Konak | 137/3 |
| 4,576,036 | 3/1986 | Huang et al. | 73/29 |
| 4,581,926 | * 4/1986 | Moore et al. | 73/155 |
| 4,681,466 | 7/1987 | Chien et al. | 374/42 |
| 4,688,418 | 8/1987 | Cheung et al. | 73/29 |
| 5,031,465 | 7/1991 | Redus | 73/861.04 |
| 5,031,466 | 7/1991 | Redus | 73/861.04 |
| 5,035,146 | 7/1991 | Chien | 73/861.04 |
| 5,036,697 | * 8/1991 | Fujiwara et al. | 73/19.1 |
| 5,094,103 | * 3/1992 | Wicks, III et al. | 73/155 |
| 5,141,055 | 8/1992 | Chien et al. | 166/272 |
| 5,190,103 | * 3/1993 | Griston et al. | 166/250 |
| 5,250,104 | 10/1993 | Berger et al. | 95/254 |
| 5,285,962 | 2/1994 | Stoy et al. | 237/9 |
| 5,400,657 | * 3/1995 | Kolpak et al. | 73/861.04 |
| 5,415,195 | 5/1995 | Stoy et al. | 137/8 |
| 5,551,469 | 9/1996 | Woerheide | 137/8 |
| 5,861,755 | * 1/1999 | Moerk et al. | 324/663 |

OTHER PUBLICATIONS

Suzanne Griston and Jai H. Choi, "SPE 46237 Two–Phase Flow Splitting at Side–branching Tees".
Texaco E & P Technology Department Brochure, "The SpliTigator™".
Texaco's First Kern River System.
Texaco's Second Kern River System.

* cited by examiner

Primary Examiner—Hezron Williams
Assistant Examiner—David J. Wiggins
(74) Attorney, Agent, or Firm—Morris N. Reinisch; Howrey Simon Arnold & White (57) ABSTRACT

An apparatus and method are described for use in the area of equalizing and measuring the quality of steam exiting multiple branches in a two-phase distribution system. The system utilizes fluid level elevational differences to provide a self-correcting mechanism so that the system may be utilized regardless of incoming fluid quality or pressure. The system does not require an inlet seperator. A system having a T-junction with upper and lower manifolds is described. Also described is a system having a differential liquid bypass and vapor branch with flow restrictions. The flow restrictions may be an orifice plate, a venturi, or a control valve.

39 Claims, 9 Drawing Sheets

APPARATUS AND METHOD FOR CONTROLLING AND MEASURING STEAM QUALITY

BACKGROUND OF THE INVENTION

1. Field of the Invention

The invention relates to fluid flow systems and methods in general. More particularly, this invention relates to an apparatus and method for controlling and measuring the quality of a fluid mixture, such as steam, exiting branch conduits in a fluid distribution system.

2. Description of the Related Art

In the field of fluid flow measurement and control, it is often desirable to have uniform characteristics of that fluid flowing through multiple branches of a distribution system. For example, steam is often used to enhance the oil recovery from a reservoir. In the field of oil field technology, enhanced oil recovery operations are now common. Enhanced oil recovery operations recover oil or petroleum from marginal fields by stimulating flow of production of crude petroleum to an economically satisfactory level. Thermal methods of enhanced recovery introduce heat into a reservoir to improve the recovery of hydrocarbons.

One type of thermal method of enhanced oil recovery is steam flooding. In this method, steam is injected into the reservoir through an elaborate series of conduits or pipes. This steam supplies both heat and a fluid to the reservoir, which assists in extracting any remaining hydrocarbons from the reservoir. Steam generators supply saturated steam consisting of both gaseous steam vapor and liquid water.

A problem has been identified with providing steam to these reservoirs: the quality of steam varies. Steam quality at any given point depends on the steam quality generated at the source and the number and orientation of T-junctions. As steam is directed to the various wells in the field through the branching conduits, or T-junctions, the liquid and vapor phases will not split in equal proportion. This phenomenon is commonly referred to as phase splitting.

For instance, in a normal branch T-junction, the quality of steam diverted through the branch can vary depending on the inlet steam quality and the rate of flow through the main pipe. Also, normal branch T-junctions have a tendency to preferentially divert vapor from the main pipe into the branch. The steam quality is thus higher in the branch, and the steam quality in the main pipe diminishes downstream of the branch. Therefore, the quality of steam varies from branch to branch. But in most applications it is desirable to deliver steam of nearly equal quality to every branch in a distribution system because varying qualities of steam from branch to branch makes it difficult to efficiently manage a steam flood operation.

Figure 1:
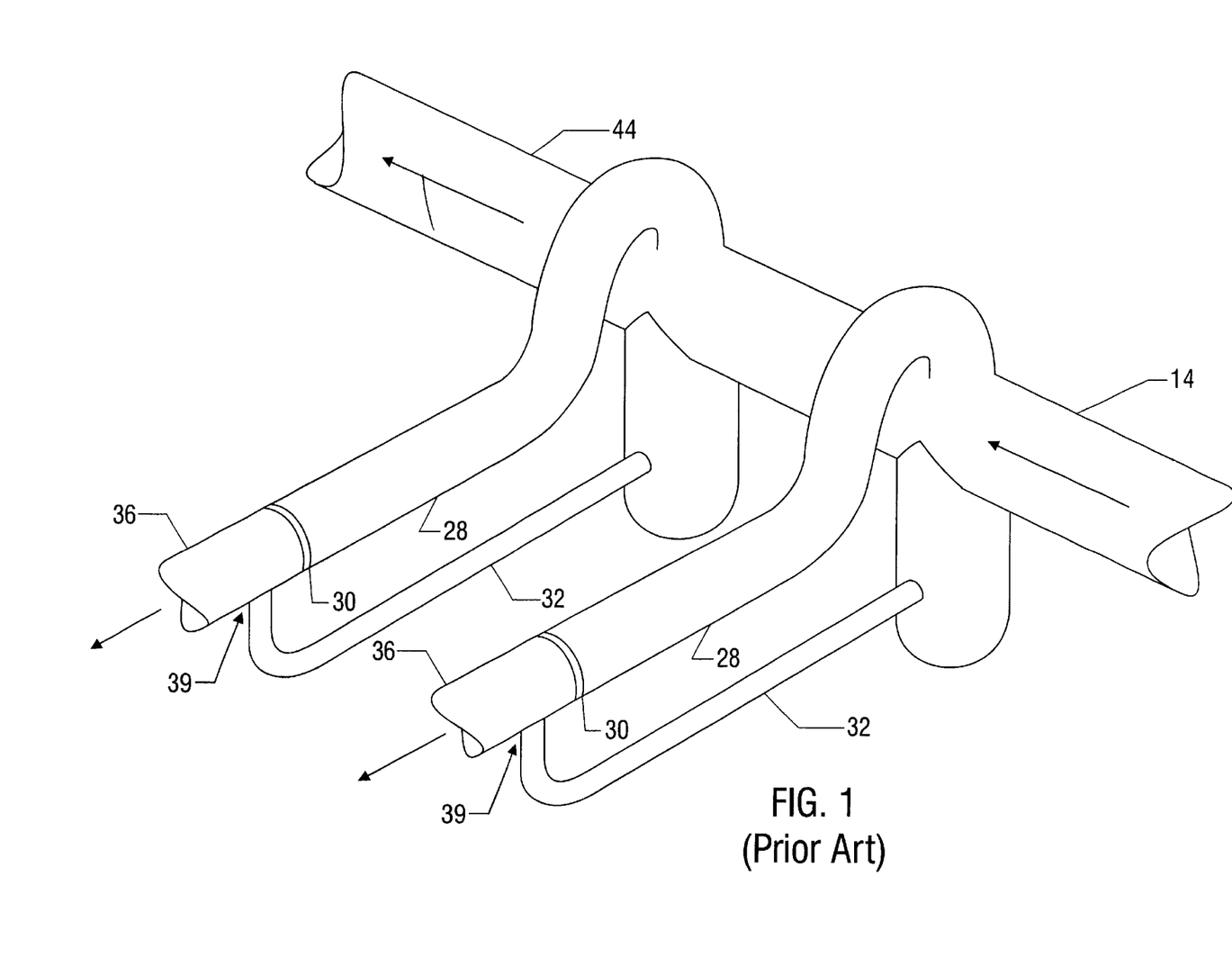
FIG. 1 shows a prior art system partially described in U.S. Pat. No. 4,415,195.

Several attempts to control fluid quality at multiple branches in a manifold systems are known. For instance, U.S. Pat. No. 5,250,104 (the "'104 patent") to Berger et al. describes a method and apparatus for controlling phase splitting at pipe junctions. As shown in FIG. 1 of the '104 patent, the '104 patent attempts to separate the stream of flow into its liquid and vapor phases upstream of the junction, and recombine them just downstream of the junction in proportion to the vapor mass rate flowing in each outlet leg. The underlying concept of the '104 patent is to size the piping elements which comprise the vapor branch, typically including an orifice plate, with respect to the piping components comprising the liquid bypass line, which can be as simple as a single length of tubing and can be constructed with or without means for measurement or adjustment, such that the vapor and liquid mixture ratio, steam quality, flowing to each outlet branch is constant.

However, the components for use in practicing the '104 patent must be designed for specific values of pressure and steam quality ranges. Thus, such a system must be sized according to the anticipated steam quality and pressures to be used in the field. Should these steam quality and pressures vary significantly, the '104 will not deliver steam of uniform quality as desired since '104 patent provides no passive adjustment mechanism. Further, for the '104 to be practiced successfully, it has been discovered that nearly 100% phase separation is necessary.

Another approach to control that steam quality was uniform in each branch of a steam distribution system is described in U.S. Pat. No. 5,415,195 to Stoy, et al. (the "'195" patent) entitled "Method and Apparatus for Controlling Phase Splitting at Branch T Pipe Junctions." The invention described in the '195 patent comprises a system that maintains steam quality in the branch despite changes in the inlet steam quality or changes in the rate of flow through the main pipe or the branch.

The steam quality delivered by the branches of systems utilizing the '195 patent will be determined by the geometry of the components used; however, for any given geometry, a balance between the vapor pressure drop and the liquid pressure drop will be established. This pressure drop balance is used to maintain branch steam quality.

Nearly perfect phase separation is difficult to achieve under a variety of flow conditions. The '195 patent attempts to solve this problem by having the branches take whatever vapor and the liquid they desire. Then, whatever is left remains in the main pipe, or "run." Thus, while the branches may deliver steam of uniform quality, the quality of steam remaining in the "run" is unknown. Since the run steam is not single phase, it cannot be measured with single-phase measurement devices. Also, pressure decreases will increase the vapor specific volume, resulting in decreased branch steam qualities. While active adjustment of control valves on branches of such a steam distribution system could possibly provide a desired steam quality, such active control is time-consuming, generally labor-intensive, and therefore impractical for most steam distribution systems.

Thus, it is desired to control a uniform quality of steam passing through every branch of a steam distribution, even if the incoming steam quality varies, without active adjustment. Also, it is desired to measure steam quality in every branch including the last branch of a steam distribution system, i.e. even the steam quality in the "run" is known.

The present invention is directed to overcoming, or at least reducing the effects of, one or more of the problems set forth above.

SUMMARY OF THE INVENTION

In some embodiments, the system includes a T-junction at its entrance, instead of large, bulky, costly, vertical separation tank of prior art systems. This lowers the cost of this system significantly without affecting performance. Further, because the liquid head is intentionally non-zero, the system described is self-compensating for various values of incoming steam quality and pressure. Also, because there is no "run" in this system, the steam exiting each branch is assured, i.e. there is no leftover, difficult-to-measure steam.

In accordance with another aspect of the present invention, an apparatus is provided for assuring substantially equal steam quality exiting multiple branches of a steam distribution manifold comprising an inlet T-junction having an inlet connected to a steam flow pipe, said inlet T-junction having a vapor outlet and a liquid outlet, an upper manifold having a termination connected to said vapor outlet, a lower manifold having a termination, said lower manifold connected to said liquid outlet, said upper manifold being located elevationally above said lower manifold, a communication means, said communication means substantially vertically interconnecting the upper manifold and the lower manifold, a vapor branch having a differential pressure producer, said vapor branch being connected to said upper manifold, a liquid bypass having a flow restriction means, said liquid bypass being connected to said lower manifold; and an outlet connected to said differential pressure producer and to said flow restriction means to recombine the vapor and liquid mixture. In some embodiments, the inlet T-junction is horizontal; in some embodiments the inlet T-junction is vertical. In some embodiments, the differential pressure producer is a venturi, a control valve, or an orifice plate for example.

In some aspects, an apparatus is provided for equalizing steam quality exiting multiple branches of a steam distribution system, comprising an upper manifold having a termination, said upper manifold being connected to a steam flow inlet, a common sump substantially perpendicularly connected to said upper manifold, at least two vapor branches, each connected to the upper manifold and having a differential pressure producer, a liquid bypass connected to said common sump, said liquid bypass having a flow restriction means, said liquid bypass being located elevationally lower than said vapor branches, an outlet connected to said differential pressure producer and flow restriction means to recombine the vapor and liquid mixture.

In another embodiment of the invention, an apparatus is provided for equalizing steam quality exiting multiple branches of a steam distribution manifold, comprising at least two inlet T-junctions, each having an inlet connected to a steam flow pipe, each said inlet T-junction having a, vapor outlet and a liquid outlet, an upper, manifold being connected to said vapor outlets, a lower manifold connected to each said liquid outlet, said upper manifold being located elevationally above said lower manifold, a communication means, said communication means substantially vertically interconnecting the upper manifold and the lower manifold, a vapor branch having a differential pressure producer and being connected to said upper manifold, a liquid bypass having a flow restriction means and being connected to said lower manifold, and an outlet connected to said differential pressure producer and to said flow restriction means to recombine the vapor and liquid mixture.

Also described is an apparatus for assuring a homogenous flow of a fluid mixture of substantially equal gas-to-liquid ratio exiting multiple branches of a manifold, comprising an inlet T-junction having an inlet connected to a fluid mixture flow pipe, said inlet T-junction having a gas outlet and a liquid outlet, an upper manifold having a termination, said upper manifold connected to said gas outlet, a lower manifold having a termination, said lower manifold connected to said liquid outlet, said upper manifold being located above said lower manifold, a communication means, said communication means substantially vertically interconnecting the upper manifold and the lower manifold, a gas branch having a differential pressure producer, a liquid bypass having a flow restriction means, an outlet connected to said differential pressure producer and flow restriction means to recombine the vapor and liquid mixture.

In this way, this embodiment utilizes the changing liquid head level to promote single-phase flow in all branches of a manifold. Liquid head is intentionally non-zero and is utilized as a means to self-compensate for changes in inlet steam quality, or pressure, without active control. Further, because of the communication means, nearly perfect phase splitting is not required in the described system.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The invention relates to an apparatus and a method to control and -measure the vapor liquid mixture ratio ("quality"), such as steam quality, exiting every branch of a two phase distribution manifold. In some embodiments, the system includes a T-junction at its entrance, instead of large, bulky, costly, vertical separation tank of prior art systems. The T-junction inlets may be either vertical or horizontal. This lowers the cost of this system significantly without affecting performance. Further, because the liquid head is intentionally non-zero, the system described is self-compensating for various values of incoming steam quality and pressure. Also, because there is no "run" in this system, the steam exiting each branch is controlled, i.e. there is no leftover, difficult-to-measure steam.

In all embodiments, the liquid head acts as a self-compensating mechanism to assist in the control and measurement of steam quality. Therefore, because this liquid head assists in equalizing the steam quality exiting each branch of the manifold, each branch of the manifold produces substantially the same steam quality, unlike the uncontrolled run in the prior art. Further aspects and advantages of the various embodiments of the invention will become apparent from consideration of the following description and drawings.

Referring to FIG. 1, a prior art steam manifold system is shown to be made up of a steam flow pipe 14, connected to two branching devices as described in U.S. Pat. No. 5,415, 195. Steam is split into its vapor and liquid phases as follows: vapor travels through vapor branch 28, while liquid passes through liquid bypass 32. The liquid and vapor are recombined after the vapor passes through a differential pressure producer such as an orifice plate. The recombined steam then travels through outlet 36. Any steam, which does not enter the branching device, travels through run 44. As described above, this run steam is of unknown quality, and cannot be measured easily by this device because the flow is not single-phase.

Figure 2:
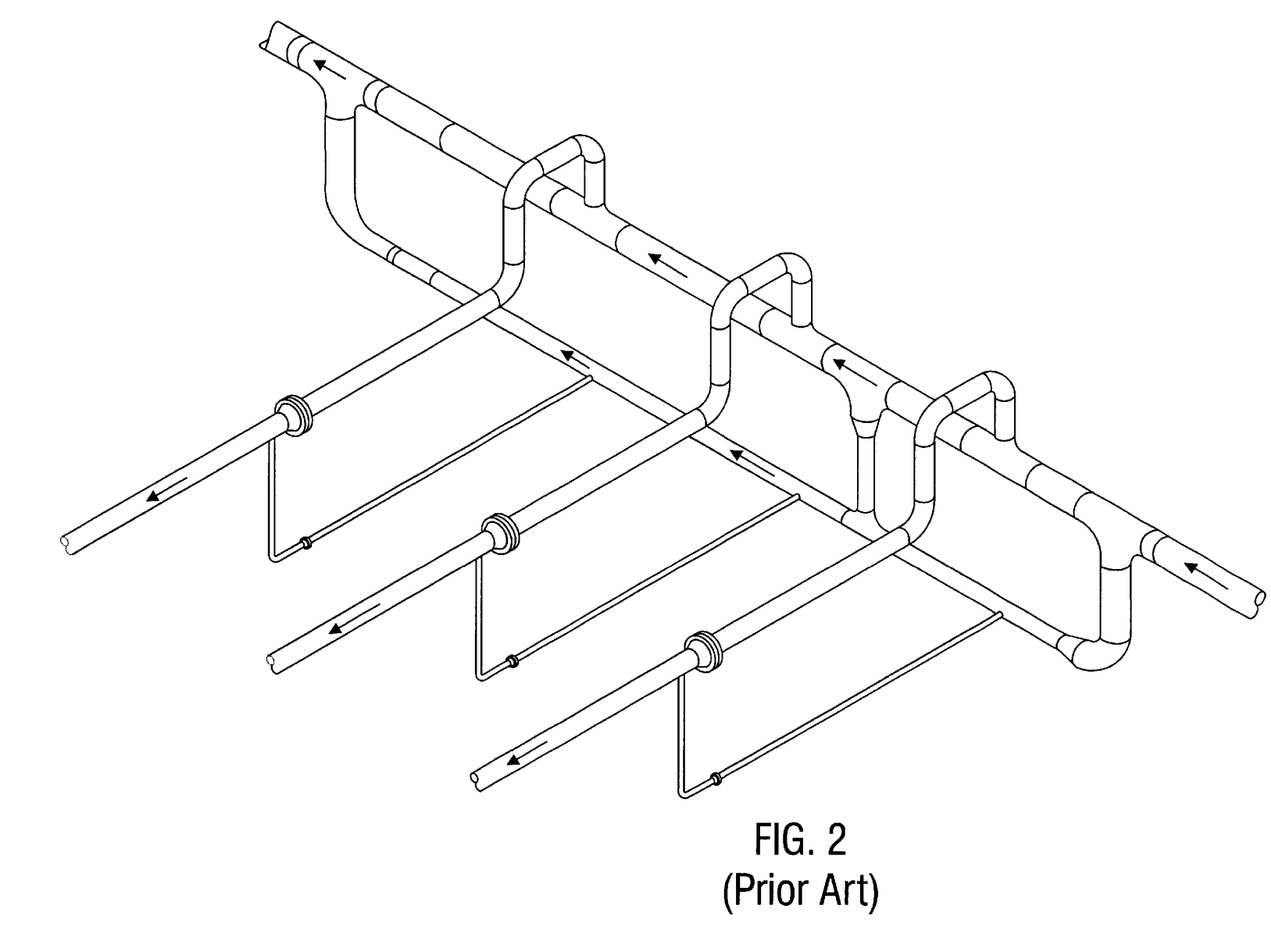
FIG. 2 shows a prior art system containing a run with steam of unknown quality.

Similarly in FIG. 2, showing another prior art system with an entrance pipe 14 and an exit pipe 44, the same "run" is present as shown at 44 which contains steam of unknown quality, which cannot be measured easily since the flow is not single-phase.

Figure 3A:
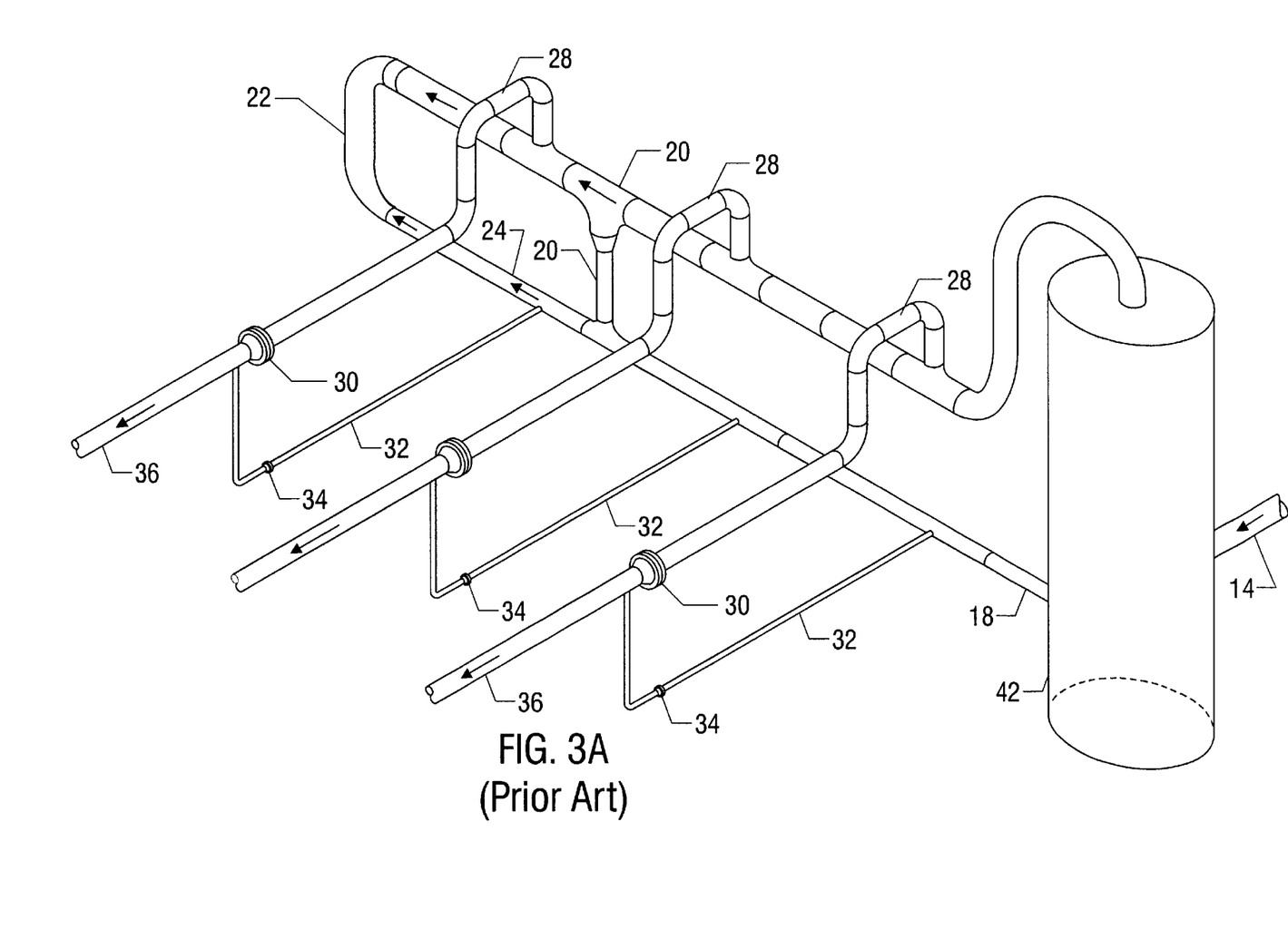
FIG. 3A shows a prior art system with a large, vertical separation tank.

Referring to FIG. 3A, another prior art steam manifold system is shown to be made up of a flow pipe 14 connected to a vertical separation tank 42 with a vapor outlet 16 and a liquid outlet 18. Vapor outlet 16 is connected to upper manifold 20 though which nearly 100% vapor passes. Attached to the upper manifold 20 are multiple vapor branches 28. Vapor branches 28 are connected to differential pressure producer 30 which is connected to outlet 36.

Liquid outlet 18 connects to lower manifold 24. Attached to lower manifold 24 are multiple liquid bypasses 32, each of which is connected to a flow restriction means 34 which, in turn, are connected to outlet 36. Connecting the upper manifold 20 to the lower manifold 24 is interconnecting means 26. Termination 22 prevents steam from exiting the system. In this system, a separation tank 42 is utilized to ensure nearly perfect phase splitting.

In operation, steam of a given quality passes through flow pipe 14 into vertical separation tank 42. Vertical separation tank 42 operates to perform nearly complete phase splitting operation. Vapor only exits from the upper vapor outlet 16, while liquid only exits from liquid outlet 18. Separation tank 42 includes a mist eliminator and an inlet centrifugal separator (not shown). The mist eliminator is a horizontal metal screen upon which liquid condenses and falls down to the liquid branch instead of traveling upward to the vapor branch. Further, the inlet separator imparts centrifugal motion to the incoming fluid, in order to separate liquid from vapor. In this way, the vertical separation tank performs nearly perfect phase separation, i.e. vapor of over 95% quality, and liquid of essentially 0% quality, are delivered to the vapor and liquid branches respectively.

Vapor passes through vapor branch 28 and differential pressure producer 30 to recombine with liquid to flow out outlet 36. Similarly, liquid exits lower manifold 24 through liquid bypass 32 and passes through flow restriction means before recombining with vapor at outlet 36.

Because of the presence of the separator, this system is bulky and costly to operate. It is desirable to have a simpler, less expensive system to equalize and measure quality of steam passing through multiple branches of a steam distribution system.

Figure 3B:
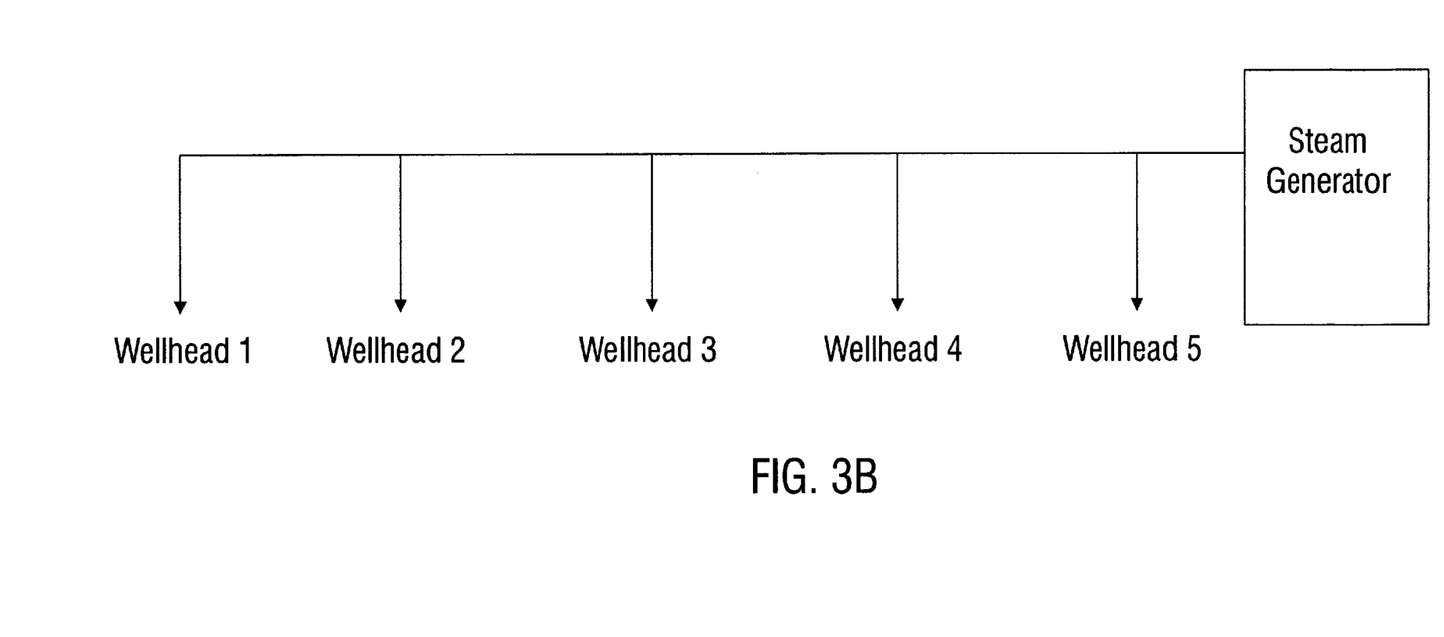
FIG. 3B shows a problem encountered in the prior art.

FIG. 3B depicts a problem which cannot be overcome with the current technology. FIG. 3B depicts a simplified oil recovery steaming operation. A steam generator provides steam to wellheads 1–5, for example. To actively manage the distribution of steam, it may be desired to provide steam to wellheads at different times. For example, it might be desired to provide steam to wellhead 1 and 4, while shutting off the supply of steam to other wellheads in the field, e.g. 2, 3, and 5, via shut off valves. Thus, the technology of the prior art such as of the '195 patent could not be properly applied to this arrangement because the last well in the series would have no "run", for dispensing the steam that was left over. In this configuration, any well could be the "last" well in the sequence at any given time depending on the desired configuration. Whatever well happens to be last in the sequence at a given time will receive steam of unknown, uncontrolled quality. Single-phase liquid and vapor measurements in the last branch would be extremely difficult. Therefore, it is desired to be able to deliver steam of nearly equal to each wellhead in the system described in FIG. 3B, while inlet conditions of the manifold are changing.

The appended claims are intended to cover all such modifications and variations not limited to the specific embodiments which occur to one of ordinary skill in the art; the claims are not limited to the specific embodiments earlier described. Although various embodiments have been shown and described, the invention is not so limited and will be understood to include all such modifications and variations as would be apparent to one skilled in the art.

Figure 4A:
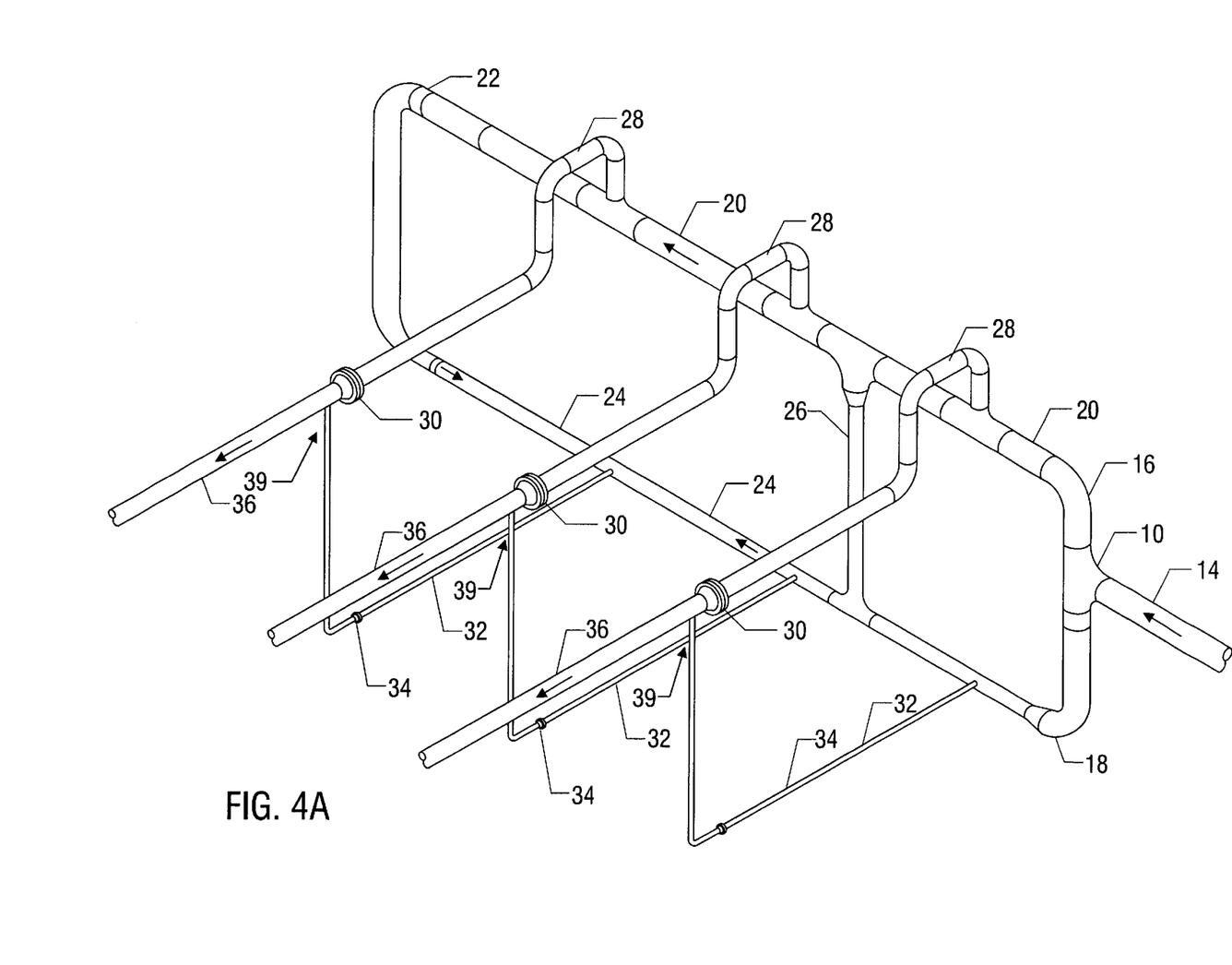
FIG. 4A illustrates an embodiment of the present invention which includes terminations 22 on the manifold branches.

Referring to FIG. 4A, one embodiment of the present invention is shown. Steam flow pipe 14 is connected, via inlet T-junction 10 to vapor outlet 16 and liquid outlet 18. Vapor outlet 16 is connected to upper manifold 20 which is terminated at termination 22. Vapor branches 28 are connected to upper manifold 20. Connected to vapor branches 28 are differential pressure producers 30, which are connected to outlet 36. Differential pressure produces 30 can be of any variety such as an orifice plate, a venturi, or control valves, for example. Lower manifold 24 is terminated by terminations 22, and is connected to liquid bypasses 32. Liquid bypasses 32 are connected to flow restriction means 34, then to outlet 36. Flow restriction means 34 can by of any variety, including, but limited to, an orifice plate, a control valve, or a venturi.

In operation, steam of any quality enters the device through steam flow pipe 14 and is diverted to either upper manifold 20 or lower manifold 24 via inlet T-junction 10, and the corresponding vapor outlet 16 or liquid outlet 18. Because upper manifold 20 and lower manifold 24 are interconnected via communication means 26, perfect phase separation is not required to be performed by inlet T-junction 10—as is required by prior art vertical storage tank systems. In this embodiment, inlet T-junction is shown as a vertical T-junction, although horizontal T-junctions may also be utilized as disclosed in FIG. 4B. Vapor travels through vapor branches 28 and through differential pressure producer 30 before recombining with liquid at outlet 36. Similarly, liquid travels through liquid bypass 32 and flow restriction means 34 before being recombined with vapor at outlet 36.

Termination 22 ensures that there is no "run" for steam of unknown, difficult-to-measure quality which is a significant improvement over prior art. Terminations 22 can be caps places on the steam flow pipes, or elbow conduits returning liquid or vapor back to the upper or lower manifold, for example. Further, communication means 26 serves the function of connecting the upper manifold 20 to lower manifold 24. Because simple inlet T-junction 10 is used—and not the bulky, expensive, and complicated separation tanks of the prior art—100% phase split will not occur in the simple inlet T-junction. Thus, if liquid passes through the upper manifold, it will wind up gravitating downward through communication means 26, instead of floating upwardly through vapor branches 28. Similarly, when vapor travels through liquid outlet 18 to lower manifold 24, instead of passing through liquid bypass 32, the vapor will float through communication means 26 to enter the vapor branch.

Even with such counter-flow, an effective fluid level naturally develops in the interconnecting pipes. The rise and fall of this fluid level compensates for changing inlet conditions. In this way, this embodiment of the invention self-corrects itself to deliver steam of substantially equal quality to all branches of the system.

Further, the rising and falling of the fluid level in the communication means 26 act to compensate for changes in steam quality. In this system, steam quality control is achieved by balancing three pressure drops: vapor pressure drop, liquid pressure drop, and liquid head. Vapor pressure drop is created by differential pressure producer 30. These elements create a pressure drop in the vapor path that is proportional to the square of the vapor velocity. Similarly, liquid pressure drop is created mainly by flow restriction elements 34 which creates a pressure drop in the liquid bypass 32 that is proportional to the square of the liquid velocity. Liquid head is represented by the difference between the fluid level in the communication means, and the fluid level at the point of recombination, 39. Liquid head can be positive, in which case the fluid level in the communication means 26 assists in pushing liquid through the bypass line resulting in a lower branch steam quality than if the liquid head were not present. Or, liquid head can be negative, in which case the fluid level at the recombination point 39 restricts the flow of liquid through the bypass line, resulting in a higher branch steam quality. As the fluid level in communication means 26 rises and falls, compensation for changing incoming qualities is achieved If inlet quality drops, the fluid level will rise, resulting in more liquid exiting each branch. Thus, the quality in each branch will be nearly equal to what is coming into the system without any active control. Each branch will continue to consist of easily measurable single-phase flows.

The system is also tolerant of pressure changes. If the pressure is lowered from an established base condition, the resulting expansion of the vapor phase will result in increased vapor pressure drop. Since the liquid phase does not similarly expand, its pressure drop remains constant. Therefore, the vapor and liquid pressure drops will no longer be in balance and less vapor will flow in each branch. But this will also result in a drop in effective fluid level, which results in less liquid bypass flow as well. Similarly, a fluid level rise compensates for pressure increases.

Figure 4B:
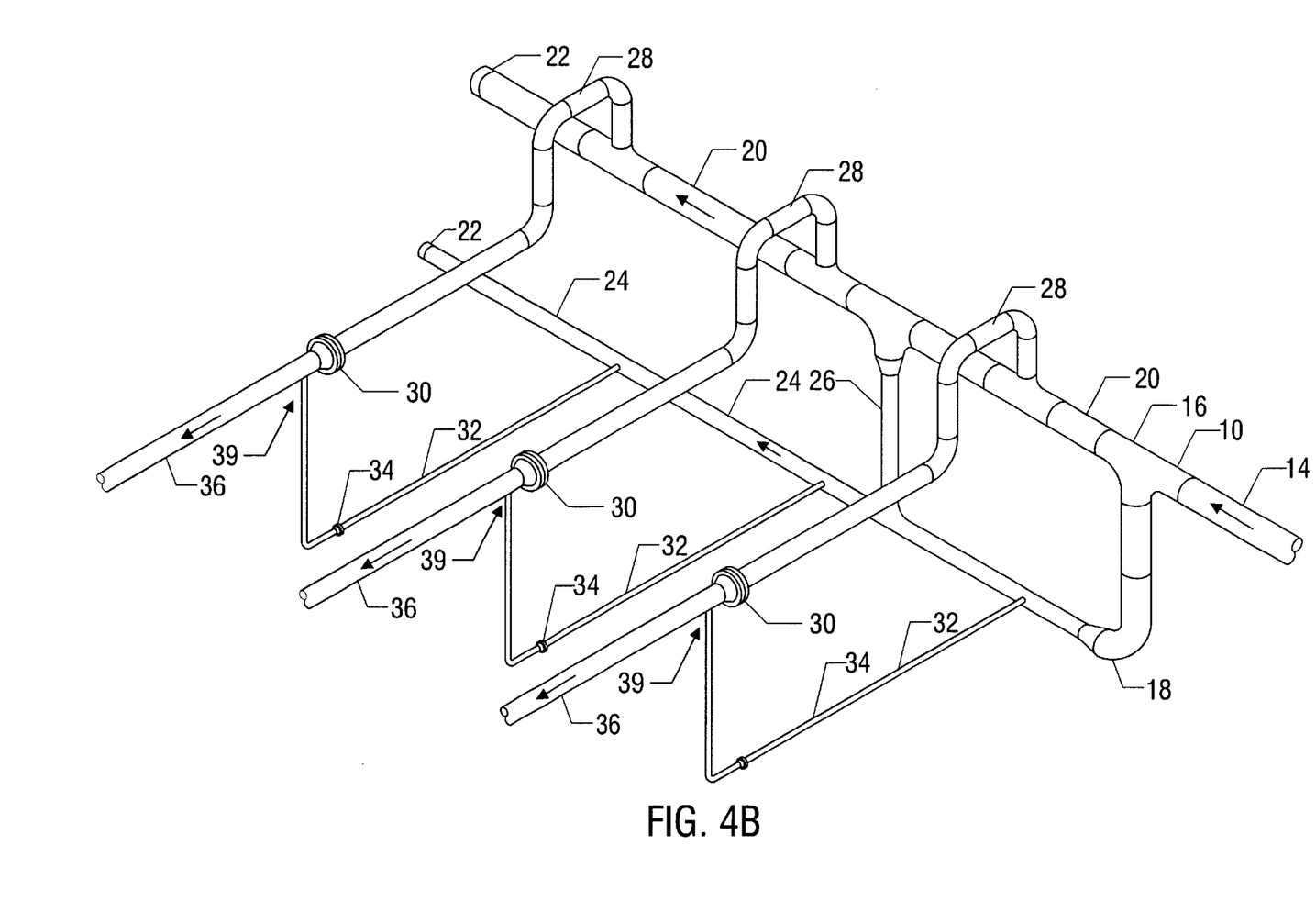
FIG. 4B illustrates another embodiment of the present invention which includes terminations 22 on the manifold branches.

FIG. 4B depicts an embodiment in which terminations 22 are simply caps on the end of the steam flow pipes. Further, inlet T-junction 10 is shown in this embodiment as a horizontal T-junction.

Figure 5:
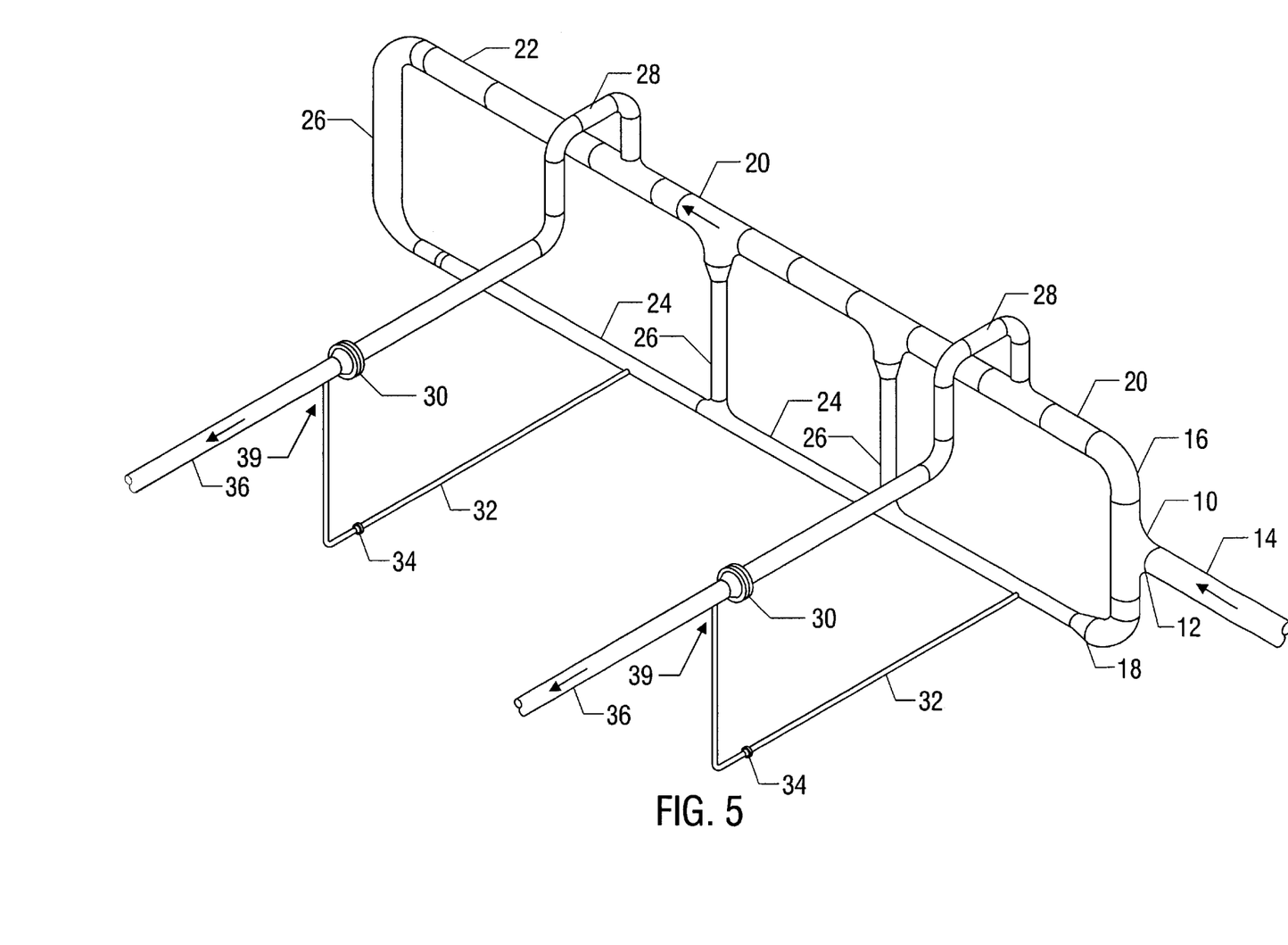
FIG. 5 illustrates an embodiment of the present invention which includes a two branches and three communication means.

Various embodiments of the invention disclosed are possible. For example, an infinite number of combinations of the number of communication means, and the number of vapor and liquid branches are possible. For instance, referring to FIG. 5, another embodiment of the invention is shown in which three communication means 26 connect upper manifold 20 to lower manifold 24. Further, two vapor branches 28 and two liquid branches 32 are present in this embodiment However, this embodiment of the invention operates in the same fashion as the embodiment of FIG. 4A and FIG. 4B.

Figure 6:
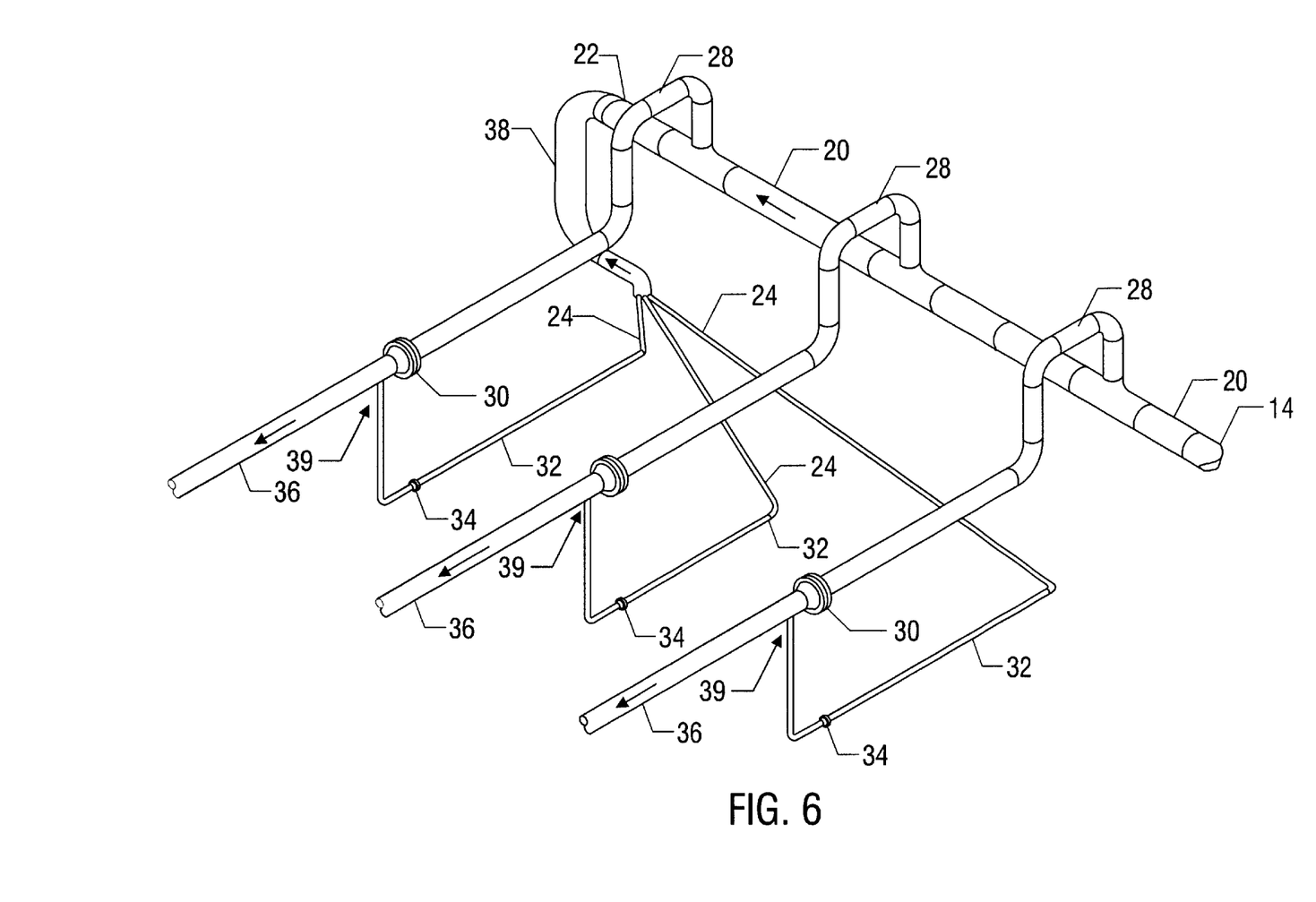
FIG. 6 illustrates an embodiment of the present invention including a common sump.

FIG. 6 shows another embodiment of the present invention. In operation, steam enters the system through steam flow pipe 14 and enters the upper manifold. The upper manifold has termination 22. Vapor is extracted by vapor branches 28 and through differential pressure producers 30 before being combined with fluid in outlet 36. In this embodiment, liquid gravitates through common sump 38 before travelling through lower manifold 24, liquid bypass 32, flow restriction means 34, before being recombined with vapor at outlet 36. Again, the fluid level within the common sump 38 acts as a self-correcting mechanism. Further, it is often desirable for the flow of the incoming fluid to be stratified, as opposed to annular with liquid clinging to the internal walls of the pipes This stratified flow can be accomplished with commonly known engineering methods such as widening the diameter of the inlet pipe, or reducing the mass flow rate of the incoming steam.

Figure 7:
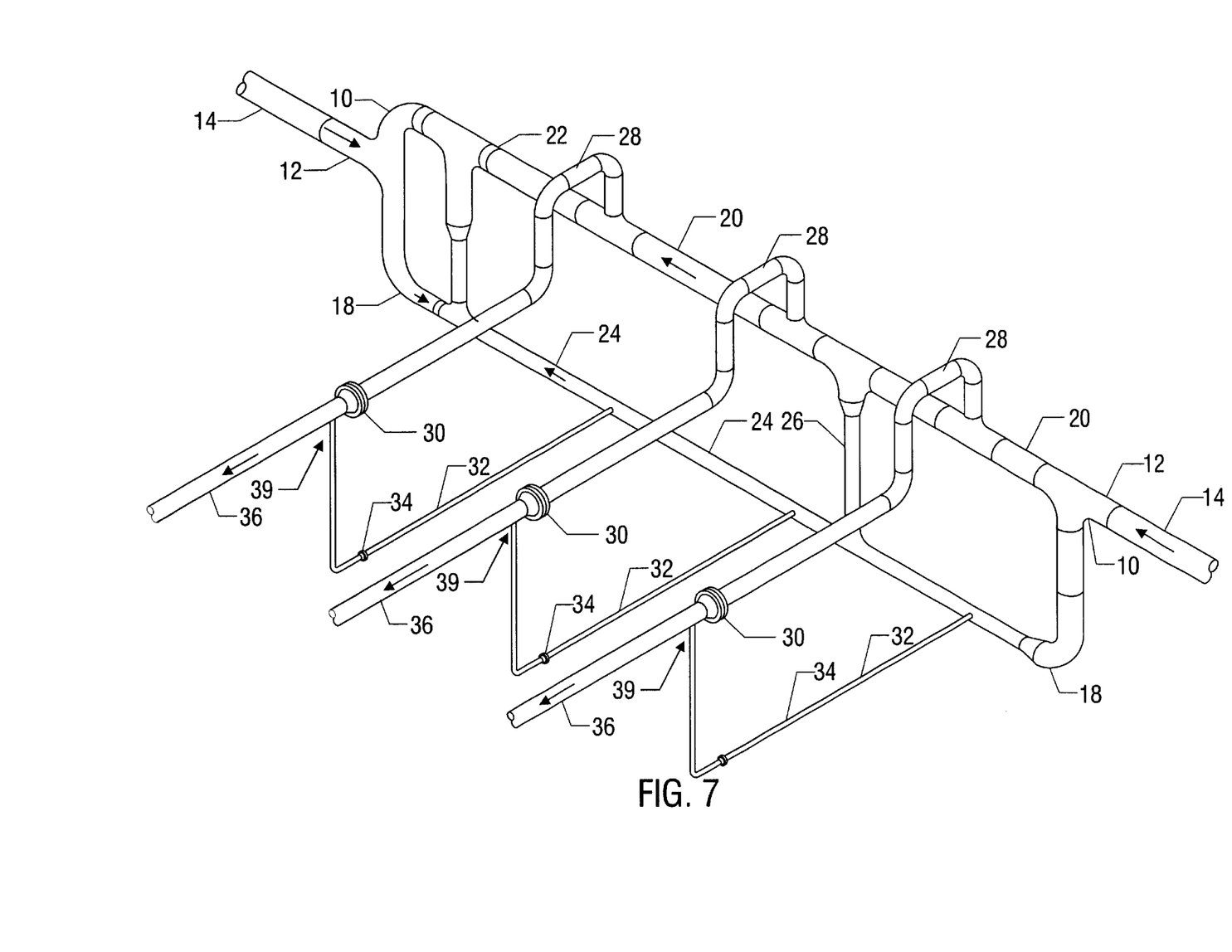
FIG. 7 illustrates an embodiment of the present invention including two inlets.

FIG. 7 shows another embodiment of the present invention which replaces termination 22 on the upper and lower manifolds with another inlet steam pipe 14. In operation, steam enters the system through steam pipe 14 from both ends of the system as shown by the arrows through inlets 12. Inlet T-junctions 10 divide the flow into two streams, although not performing the phase splitting operation as with a separator: upper manifold 20 and lower manifold 24. If phase separation at these inlets is incomplete, vapor can bubble up through interconnecting means 26 into upper manifold 28. Similarly, liquid can gravitate down to lower manifold 24.

Vapor exits the upper manifold 20 through vapor branches 28 and finally passes through differential pressure producers 30 before being recombined with liquid at outlets 36. Similarly, liquid exits the lower manifold 24 through liquid bypasses 32 before passing through flow restriction means 34 before recombining with vapor at outlets 36. As in other embodiments, the differential pressure producers and the flow restricting means can be any type such as an orifice plate, a venturi, or a control valve. The self-compensating method of operation in this embodiment operates in the same fashion as it does in the previous embodiments.

In this embodiment two inlets 12 are shown. Had one of the inlets actually been an outlet pipe, the system described in this patent would be like a prior art "run"—with a difficult-to-measure quality of steam.

Generally, commonly known engineering equations, measuring devices, and measurement methods make it possible to accurately determine the flow rate of single-phase fluids. For example, it is possible to accurately measure the commercially available differential pressure measuring devices such as an electronic transmitter. In each of the embodiments shown in FIGS. 4A–7, the measurement of steam quality is possible. In these embodiments, the fluid-vapor-mixture is divided into its constituent components—which can be measured using commercially available differential pressure measuring devices. For example, liquid travels through the liquid bypass 32. By placing a differential pressure-measuring device across flow restriction means 34, mass flow rate of the liquid can be readily determined. Similarly, the mass flow rate of vapor can be determined by providing a differential pressure-measuring device across differential pressure producer 30. In this way, the steam quality at the recombination point 39 can be determined.

Although various embodiments have been shown and described, the invention is not so limited and will be understood to include all such modifications and variations as would be apparent to one skilled in the art.

What is claimed is:

1. An apparatus for equalizing steam quality exiting multiple branches of a steam distribution manifold, comprising:

(1) an inlet T-junction having an inlet connected to a steam flow pipe, said inlet T-junction having as outlet branches a vapor outlet and a liquid outlet;

(2) an upper manifold having a termination,
said upper manifold connected to said vapor outlet;
(3) a lower manifold having a termination,
said lower manifold connected to said liquid outlet,
said upper manifold being located elevationally above said lower manifold;
(4) a vapor phase communication means,
said communication means substantially vertically interconnecting the upper manifold and the lower manifold;
(5) a vapor branch having a differential pressure producer,
said vapor branch being connected to said upper manifold;
(6) a liquid branch that forms or includes a liquid bypass having a flow restriction means,
said liquid bypass being connected to said lower manifold; and
(7) an outlet connected to said differential pressure producer and to said flow restriction means to recombine the vapor and liquid mixture.

2. The apparatus of claim 1 in which the differential pressure producer further comprises a venturi.

3. The apparatus of claim 1 in which the differential pressure producer further comprises a control valve.

4. The apparatus of claim 1 in which the differential pressure producer further comprises an orifice plate.

5. The apparatus of claim 1 in which the flow restriction means further comprises a control valve.

6. The apparatus of claim 1 in which the flow restriction means further comprises an orifice plate.

7. The apparatus of claim 1 in which the flow restriction means further comprises a venturi.

8. A method for equalizing steam quality exiting multiple branches of a steam distribution manifold, comprising the steps of:
(1) providing steam in a steam flow pipe;
(2) connecting a flow control device including an inlet T-junction upstream of said steam flow pipe,
said flow control device having at least two outlets and being configured such that one of said two outlets is elevated over the other;
said flow control device to said steam flow pipe, said inlet T-junction having a vapor outlet and a liquid outlet;
(3) providing an upper manifold having a termination, said upper manifold connected to one of said outlets;
(4) providing a lower manifold having a termination, said lower manifold connected to one of said outlets, said upper manifold being located elevationally above said lower manifold;
(5) providing vapor phase communication means,
said communication means substantially vertically interconnecting the upper manifold and the lower manifold;
(6) providing a vapor branch having a differential pressure producer,
said vapor branch being connected to said upper manifold;
(7) providing a liquid bypass having a flow restriction means,
said liquid bypass being connected to said lower manifold; and
(8) providing an outlet connected to said differential pressure producer and aid flow restriction means to recombine the vapor and liquid mixture.

9. The method of claim 8 in which the differential pressure producer further comprises a venturi.

10. The method of claim 8 in which the differential pressure producer further comprises a control valve.

11. The method of claim 8 in which the differential pressure producer further comprises an orifice plate.

12. The method of claim 8 in which the flow restriction means further comprises a control valve.

13. The method of claim 8 in which the flow restriction means further comprises an orifice plate.

14. The method of claim 8 in which the flow restriction means further comprises a venturi.

15. An apparatus for equalizing steam quality exiting multiple branches of a steam distribution system, comprising:
(1) an upper manifold having a termination,
said upper manifold being connected to a steam flow inlet;
(2) a common sump substantially perpendicularly connected to said upper manifold;
(3) at least two vapor branches, each connected to the upper manifold and having a differential pressure producer;
(4) a liquid branch that forms or includes a liquid bypass connected to said common sump,
said liquid bypass having a flow restriction means; said liquid bypass being located elevationally lower than said vapor branches; and
(5) an outlet connected to said differential pressure producer and flow restriction means to recombine the vapor and liquid mixture.

16. The apparatus of claim 15 in which the differential pressure producer further comprises a venturi.

17. The apparatus of claim 15 in which the differential pressure producer further comprises a control valve.

18. The apparatus of claim 15 in which the differential pressure producer further comprises an orifice plate.

19. The apparatus of claim 15 in which the flow restriction means further comprises a control valve.

20. The apparatus of claim 15 in which the flow restriction means further comprises an orifice plate.

21. The apparatus of claim 15 in which the flow restriction means further comprises a venturi.

22. A method for equalizing steam quality exiting multiple branches of a steam distribution system, comprising the steps of:
(1) providing steam in a steam flow pipe;
(2) providing an upper manifold having a termination,
said upper manifold being connected to a steam flow inlet;
(3) providing at least two vapor branches,
each of said vapor branches being connected to the upper manifold and having a differential pressure producer;
(4) providing a liquid branch that forms or includes a liquid bypass connected to said common sump,
said liquid bypass having a flow restriction means; said liquid bypass being located elevationally lower the said vapor branches; and
(5) providing an outlet connected to said differential pressure producer and said flow restriction means to recombine the vapor and liquid mixture.

23. The method of claim 22 in which the differential pressure producer further comprises a venturi.

24. The method of claim 22 in which the differential pressure producer further comprises a control valve.

25. The method of claim 22 in which the differential pressure producer further comprises an orifice plate.

26. The method of claim 22 in which the flow restriction means further comprises a control valve.

27. The method of claim 22 in which the flow restriction means further comprises an orifice plate.

28. The method of claim 22 in which the flow restriction means further comprises a venturi.

29. An apparatus for equalizing steam quality exiting multiple branches of a steam distribution manifold, comprising:
   (1) at least two inlet T-junctions, each having an inlet connected to a steam flow pipe,
      each said inlet T-junction having as branch outlets a vapor outlet and a liquid outlet;
   (2) an upper manifold being connected to said vapor outlet;
   (3) a lower manifold having being connected to each said liquid outlet,
      said upper manifold being located elevationally above said lower manifold;
   (4) a vapor phase communication means,
      said communication means substantially vertically interconnecting the upper manifold and the lower manifold;
   (5) a vapor branch, having a differential pressure producer,
      said vapor branch being connected to said upper manifold;
   (6) a liquid branch that forms or includes a liquid bypass having a flow restriction means,
      said liquid bypass being connected to said lower manifold; and
   (7) an outlet connected to said differential pressure producer and to said flow restriction means to recombine the vapor and liquid mixture.

30. The apparatus of claim 29 in which the differential pressure producer further comprises a venturi.

31. The apparatus of claim 29 in which the differential pressure producer further comprises a control valve.

32. The apparatus of claim 29 in which the differential pressure producer further comprises an orifice plate.

33. The apparatus of claim 29 in which the flow restriction means further comprises a control valve.

34. The apparatus of claim 29 in which the flow restriction means further comprises an orifice plate.

35. The apparatus of claim 29 in which the flow restriction means further comprises a venturi.

36. A method for equalizing steam quality exiting multiple branches of a steam distribution system, comprising the steps of:
   (1) providing steam in a steam flow pipe;
   (2) providing at least two inlet T-junctions, each having an inlet connected to a steam flow pipe, each said inlet T-junction having as outlet branches a vapor outlet and a liquid outlet;
   (3) providing an upper manifold being connected to said vapor outlets;
   (4) providing a vapor phase communication means, said communication means substantially vertically interconnecting the upper manifold and the lower manifold;
   (5) providing a vapor branch having a differential pressure producer;
   (6) providing a liquid branch that forms or includes a liquid bypass having a flow restriction means; and
   (7) connecting differential pressure producer to said flow restriction means via an outlet to recombine the vapor and liquid mixture.

37. An apparatus for equalizing the gas-to-liquid ratio of a fluid mixture exiting multiple branches of a manifold, comprising:
   (1) an inlet T-junction having an inlet connected to a fluid mixture flow pipe,
      said inlet T-junction having a gas outlet and a liquid outlet;
   (2) an upper manifold having a termination,
      said upper manifold connected to said gas outlet;
   (3) a lower manifold having a termination,
      said lower manifold connected to said liquid outlet,
      said upper manifold being located elevationally above said lower manifold;
   (4) a communication means,
      said communication means substantially vertically interconnecting the upper manifold and the lower manifold;
   (5) a gas branch having a differential pressure producer,
      said gas branch being connected to said upper manifold;
   (6) a liquid bypass having a flow restriction means,
      said liquid bypass being connected to said lower manifold; and
   (7) an outlet connected to said differential pressure producer and flow restriction means to recombine the vapor and liquid mixture.

38. An apparatus for measuring the gas-to-liquid ratio of a fluid mixture exiting multiple branches of a manifold, comprising:
   (1) an inlet T-junction having as outlet branches an inlet connected to a fluid mixture flow pipe,
      said inlet T-junction having a gas outlet and a liquid outlet;
   (2) an upper manifold having a termination,
      said upper manifold connected to said gas outlet;
   (3) a lower manifold having a termination,
      said lower manifold connected to said liquid outlet,
      said upper manifold being located elevationally above said lower manifold;
   (4) a vapor phase communication means,
      said communication means substantially vertically interconnecting the upper manifold and the lower manifold;
   (5) a gas branch having a differential pressure producer,
      said gas branch being connected to said upper manifold;
   (6) a differential pressure measuring device,
      said differential pressure measuring device being connected across said differential pressure producer;
   (7) a first differential pressure measuring device connected to said differential pressure producer;
   (8) a liquid bypass that forms or includes a liquid bypass having a flow restriction means,
      said liquid bypass being connected to said lower manifold;
   (9) a second differential pressure measuring device connected to said flow restriction means; and
   (10) an outlet connected to said differential pressure producer and flow restriction means to recombine the vapor and liquid mixture.

39. A method for measuring the gas-to-liquid ratio of a fluid mixture exiting multiple branches of a manifold, comprising:

(1) providing a fluid in a pipe;

(2) providing an inlet T-junction having an inlet connected to a fluid mixture flow pipe,
said inlet T-junction having as outlet branches a gas outlet and a liquid outlet;

(3) providing an upper manifold having a termination, said upper manifold connected to said gas outlet;

(4) providing a lower manifold having a termination, said lower manifold connected to said liquid outlet, said upper manifold being located elevationally above said lower manifold;

(5) providing a vapor phase communication means,
said communication means substantially vertically interconnecting the upper manifold and the lower manifold;

(6) a gas branch having a differential pressure producer, said gas branch being connected to said upper manifold;

(7) providing a differential pressure measuring device, said differential pressure measuring device being connected across said differential pressure producer;

(8) providing a first differential pressure measuring device connected to said differential pressure producer;

(9) providing a liquid branch that forms or includes a liquid bypass having a flow restriction means, said liquid bypass being connected to said lower manifold;

(10) providing a second differential pressure measuring device connected to said flow restriction means; and (11) providing an outlet connected to said differential pressure producer and flow restriction means to recombine the vapor and liquid mixture; and (12) calculating the gas-to-liquid ratio of said fluid mixture exiting multiple branches of a manifold based on said first and second differential pressure measurements.

* * * * *